United States Patent
Scelers

(10) Patent No.: US 7,524,265 B2
(45) Date of Patent: Apr. 28, 2009

(54) POWERTRAIN OVERSPEED PROTECTION

(75) Inventor: Herve Scelers, Illkirch-Graffenstaden (FR)

(73) Assignee: GM Global Technology Operations, Inc., Detroit, MI (US)

( * ) Notice: Subject to any disclaimer, the term of this patent is extended or adjusted under 35 U.S.C. 154(b) by 385 days.

(21) Appl. No.: 11/481,399

(22) Filed: Jul. 5, 2006

(65) Prior Publication Data

US 2008/0009391 A1   Jan. 10, 2008

(51) Int. Cl.
  *B60W 10/04*   (2006.01)
  *B60W 10/10*   (2006.01)
(52) U.S. Cl. ..................................... 477/110
(58) Field of Classification Search ............... 477/107, 477/110
  See application file for complete search history.

(56) References Cited

U.S. PATENT DOCUMENTS

| | | | | |
|---|---|---|---|---|
| 4,691,285 A | * | 9/1987 | Takeda | 701/99 |
| 5,129,286 A | * | 7/1992 | Nitz et al. | 477/102 |
| 6,123,164 A | * | 9/2000 | Hrovat | 180/197 |
| 2005/0049112 A1 | * | 3/2005 | Murakami et al. | 477/109 |
| 2006/0240945 A1 | * | 10/2006 | Tanaka et al. | 477/111 |

FOREIGN PATENT DOCUMENTS

CN   1474756   2/2004

* cited by examiner

*Primary Examiner*—Tisha D Lewis

(57) ABSTRACT

A method of inhibiting an overspeed condition in a vehicle powertrain includes monitoring at least one of an engine speed and a transmission input shaft speed of a torque converter that transfers drive torque between an engine and a transmission and determining an operating condition of the vehicle powertrain. The method further includes determining a first threshold speed based on the operating condition and reducing an engine torque request when the at least one of the engine speed and the transmission input shaft speed exceeds the first threshold speed.

23 Claims, 7 Drawing Sheets

POWERTRAIN OVERSPEED PROTECTION

FIELD

The present disclosure relates to a powertrain having a transmission driven by an internal combustion engine through a torque converter, and more particularly to an overspeed protection control for a powertrain.

BACKGROUND

The statements in this section merely provide background information related to the present disclosure and may not constitute prior art.

Vehicle powertrains typically include a prime mover, such as an internal combustion engine, a transmission and a coupling device that transfers drive torque from the prime mover to the transmission. The transmission multiplies the drive torque by an applied gear ratio to drive the vehicle's drivetrain. Exemplary transmissions include an automatic transmission having fixed gear ratios and a continuously variable transmission (CVT) having infinitely variable gear ratios.

The coupling device often includes a torque converter that provides a fluid coupling between an output shaft of the prime mover and an input shaft of the transmission. As the output shaft accelerates, the input shaft is induced to accelerate through the fluid coupling. Once the input shaft speed is sufficiently near to the output shaft speed, a torque converter clutch (TCC) is engaged to provide a direct drive between the output shaft and the input shaft.

In some instances, an overspeed condition can arise, wherein an uncontrolled speed flare occurs in the powertrain. Such overspeed conditions can result in damage to engine, torque converter and/or transmission components.

SUMMARY

Accordingly, the present invention provides a method of inhibiting an overspeed condition in a vehicle powertrain. The method includes monitoring at least one of a transmission input shaft speed and an engine speed and determining an operating condition of the vehicle powertrain. The method further includes determining a first threshold speed based on the operating condition and reducing an engine torque request when the at least one of the transmission input shaft speed and the engine speed exceeds the first threshold speed.

In one feature, the method further includes providing a fixed torque reduction amount. The engine torque request is reduced by the fixed torque reduction amount.

In another feature, the method further includes determining a torque reduction amount based on a difference between the at least one of the transmission input shaft speed and the engine speed and the first threshold speed. The engine torque request is reduced by the torque reduction amount.

In another feature, the method further includes determining a second threshold speed based on the operating condition, and determining the engine torque request without a reduction when the at least one of the transmission input shaft speed and the engine speed is less than the second threshold speed.

In other features, the first threshold speed is determined based on one of an attained gear speed, a commanded gear speed and a commanded speed profile. The operating condition is one of an upshift and a downshift of a gear ratio of the transmission.

In still another feature, the operating condition is one of a garage shift condition and a neutral idle condition and the first threshold speed corresponds to a maximum engine speed limit.

In yet another feature, the transmission is one of an automatic transmission and a continuously variable transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
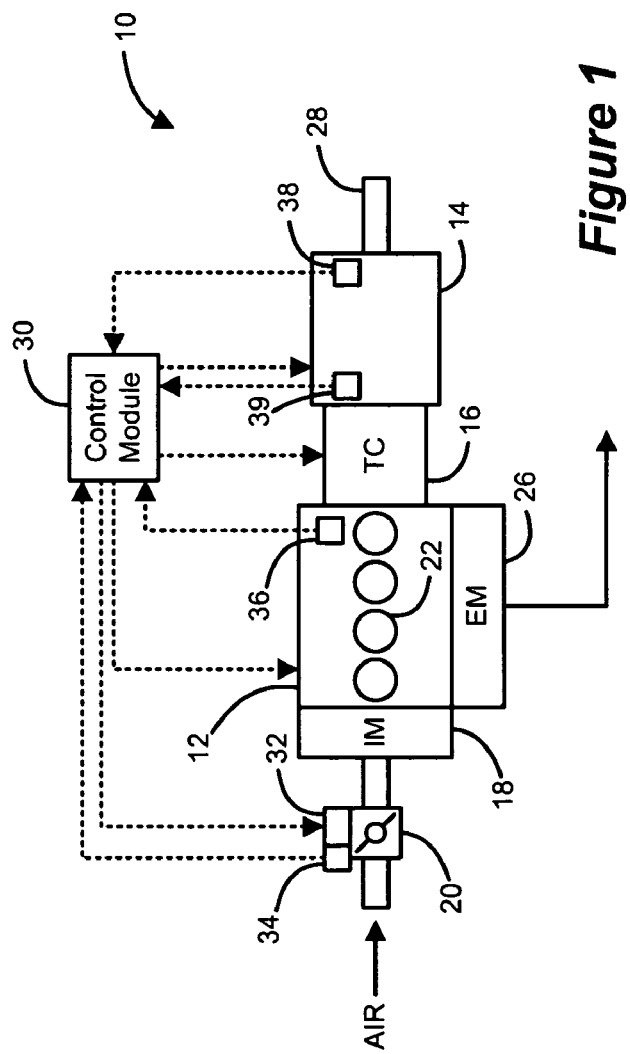
FIG. 1 is a functional block diagram of an exemplary vehicle powertrain that is regulated based on the overspeed protection control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary powertrain 10 is illustrated and includes an engine 12 that drives a transmission 14 through a coupling device 16. More specifically, air is drawn into an intake manifold 18 of the engine 12 through a throttle 20. The air is mixed with fuel and the air/fuel mixture is combusted within cylinders 22 to reciprocally drive pistons (not shown) within the cylinders 22. The pistons rotatably drive a crankshaft 24 (see FIG. 2) to provide drive torque. Exhaust generated by the combustion process is exhausted from the engine through an exhaust manifold 26. Although 4 cylinders are illustrated, it is appreciated that the present invention can be implemented in vehicles having any number of cylinders.

The drive torque drives is transferred through the torque converter 16 to drive the transmission 14. The transmission 14 multiplies the drive torque by a desired gear ratio to provide a modified drive torque. The modified drive torque is transferred to a vehicle driveline (not shown) by a transmission output shaft 28. The transmission 14 can include one of a manual transmission, an automatic transmission, an automated manual transmission and a continuously variable transmission (CVT). An automatic transmission includes a plurality of pre-defined, fixed gear ratios. A common CVT includes a belt and adjustable pulley system that enables an infinite variability between gear ratios without discrete steps or shifts.

A control module 30 regulates operation of the powertrain based on vehicle operating parameters. More specifically, the control module 30 regulates an effective throttle area ($A_{EFF}$) via a throttle actuator 32. A throttle position sensor 34 generates a throttle position signal (TPS) based on the angular position of the throttle 20. The control module 30 determines a requested engine torque ($T_{REQ}$) and adjusts the throttle position and other engine operating parameters to achieve $T_{REQ}$. The other engine operating parameters include, but are not limited to, a fueling rate, spark timing, a camshaft phase and/or an intake/exhaust valve lift or timing.

The control module 30 also regulates operation of the transmission 14 based on vehicle operating parameters. More specifically, a crankshaft position sensor 36 generates a crankshaft position signal, which is used to determine an actual engine speed ($RPM_{ENG}$). A transmission output shaft speed (TOSS) sensor 38 generates a TOSS signal, which is used to determine a vehicle speed ($V_{VEH}$), and a transmission input shaft speed (TISS) sensor 39 generates a TISS signal. The control module 30 adjusts a gear ratio of the transmission 14 based on the throttle position (i.e., TPS) and $V_{VEH}$. In an automatic transmission, the gear is shifted accordingly, and in a CVT, the pulley ratio is adjusted accordingly.

Figure 2:
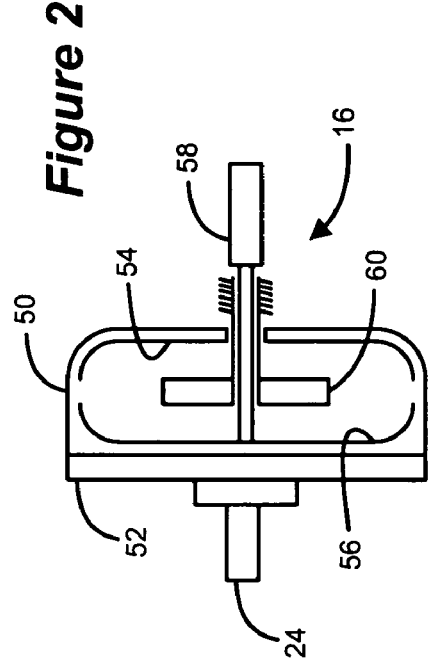
FIG. 2 is a schematic illustration of an exemplary torque converter implemented in the exemplary vehicle powertrain of FIG. 1.

Referring now to FIG. 2, the coupling device 16 is illustrated as a torque converter that provides a fluid coupling between the engine 12 and the transmission 14. Although the present invention will be described with respect to a torque converter, it is appreciated that the overspeed protection control of the present invention can be implemented with vehicle powertrains having alternative coupling devices including, but not limited to, a dual-clutch coupling device and a starting clutch coupling device.

The torque converter 16 includes a housing 50 that is fixed for rotation with the crankshaft 24 via a flywheel 52. An impeller 54 is fixed for rotation with the housing 50 and a turbine 56 is fixed for rotation with a transmission input shaft 58. A stator 60 is also provided and is fixed from rotation. The interior of the torque converter 16 is filled with a viscous fluid. Rotation of the impeller 54 induces corresponding motion of the viscous fluid, which is directed towards the turbine 56 by the stator 60 to induce rotation of the turbine 56. The torque converter 16 includes a torque converter clutch (TCC) (not shown), which is selectively engaged to proved a direct drive between the crankshaft 24 and the input shaft 58.

As the crankshaft 24 rotates at an idle speed ($RPM_{IDLE}$), the impeller 54 is induced to rotate. $RPM_{IDLE}$, however, is normally insufficient to overcome braking forces that inhibit the turbine 56 from rotating. As the braking forces are reduced and/or $RPM_{ENG}$ increases, the impeller 54 drives the viscous fluid into the turbine 56 and the turbine 56 is induced to rotate. As a result, drive torque is transferred through the transmission 14 to propel the vehicle. Upon achieving a point where there is little or no RPM difference between the turbine 56 and impeller 54, the TCC is engaged to provide a direct drive between the engine 12 and the transmission 14. Under this condition, the rotational speed of the turbine 56 ($RPM_{TURB}$) is equal to $RPM_{ENG}$. Generally, $RPM_{TURB}$ is determined based on the TISS signal and is equivalent to the TISS ($RPM_{TISS}$).

The overspeed protection control of the present invention protects the engine 12, torque converter 16 and/or transmission 14 from damage in an overspeed condition. An overspeed condition occurs when at least one of $RPM_{ENG}$ and $RPM_{TURB}$ flares and exceeds a theoretical or expected engine or turbine speed ($RPM_{ENGEXP}$, $RPM_{TURBEXP}$). It is anticipated that $RPM_{TISS}$ can replace $RPM_{TURB}$, and, as a result, the overspeed protection control of the present invention can be implemented in vehicle powertrains that do not include a torque converter. An overspeed condition can damage the engine 12, the torque converter 16 and/or the transmission 14. The overspeed protection control determines whether at least one of $RPM_{ENG}$ and $RPM_{TURB}$ exceeds an upper threshold ($RPM_{UTHR}$) and reduces $T_{REQ}$ to until it falls below a lower threshold ($RPM_{LTHR}$).

$T_{REQ}$ can be reduced by a fixed amount. Alternatively, $T_{REQ}$ can be reduced by an amount that is determined based on the difference between $RPM_{TURB}$ and $RPM_{UTHR}$. In this manner, the overspeed condition can be more rapidly resolved thereby reducing the potential for damage to the powertrain components. By regulating $T_{REQ}$, a quicker, more accurate control is provided to better inhibit or resolve the overspeed condition. In this manner, a high level of powertrain protection is provided.

As described in further detail below, $RPM_{UTHR}$ and $RPM_{LTHR}$ are determined based on a powertrain operating condition. The powertrain operating conditions include, but are not limited to, a neutral condition, an upshift condition, a downshift condition, a garage shift condition and a steady gear condition. In the case of an automatic transmission, each of these conditions can be present, wherein the overspeed protection control of the present invention includes corresponding control strategies. In the case of a CVT, the overspeed protection control for garage shift and neutral conditions can be combined under a first control strategy and the remaining conditions are combined under a second control strategy.

Figure 3:
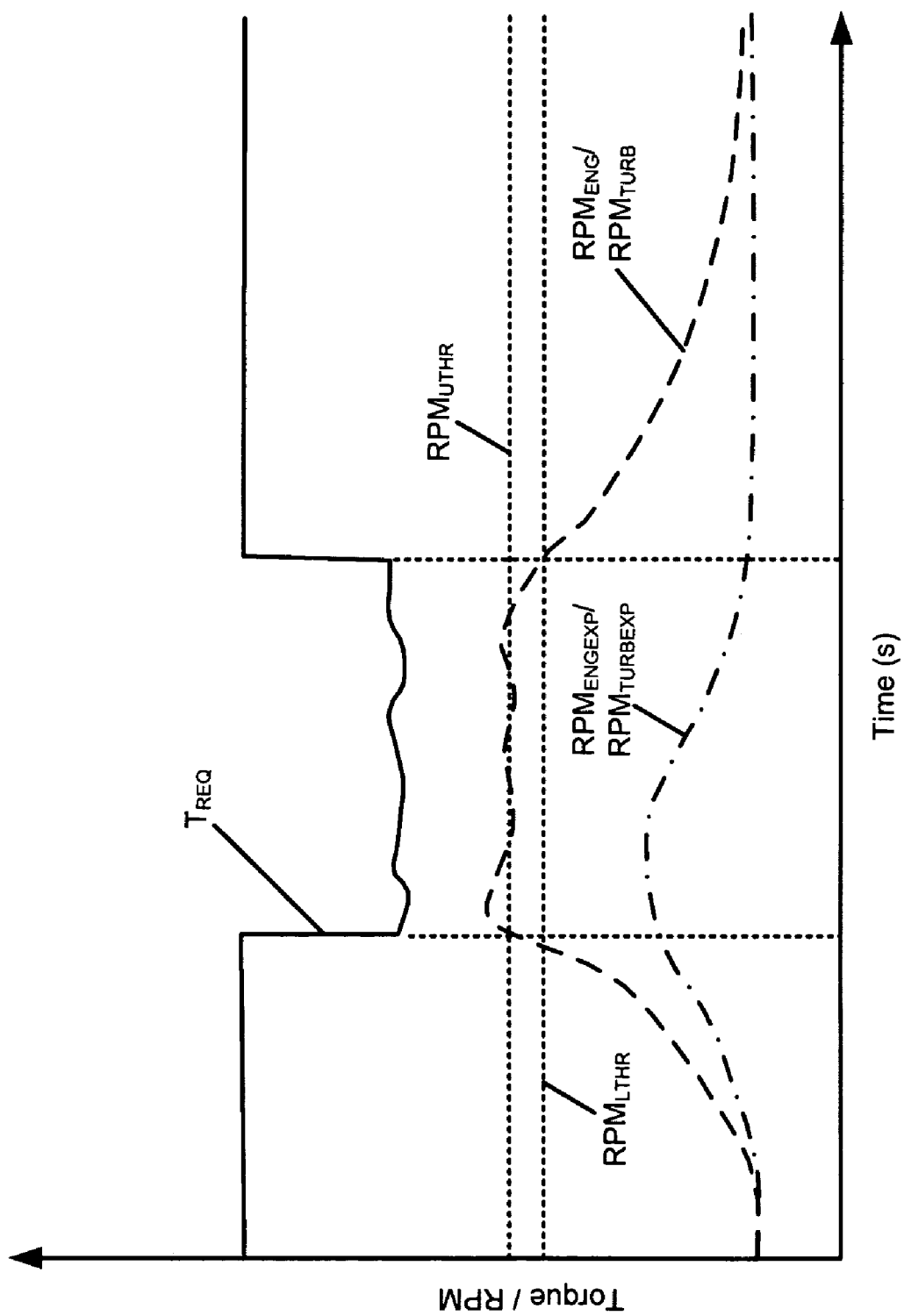
FIG. 3 is a graph illustrating exemplary operating parameters for a neutral condition in accordance with the overspeed protection control of the present invention.

Referring now to FIG. 3, the $T_{REQ}$ is reduced when at least one of $RPM_{ENG}$ and $RPM_{TURB}$ exceeds $RPM_{UTHR}$, during the neutral condition. In this manner, $RPM_{ENG}$ and/or $RPM_{TURB}$ is maintained equal to or below $RPM_{UTHR}$. If $RPM_{ENG}$ and/or $RPM_{TURB}$ falls below $RPM_{LTHR}$, the overspeed protection control is exited and $T_{REQ}$ is regulated based on normal $T_{REQ}$ control. Under the normal $T_{REQ}$ control, $T_{REQ}$ is determined based on operating parameters including, but not limited to, MAP and $RPM_{ENG}$, and TPS.

Figure 4:
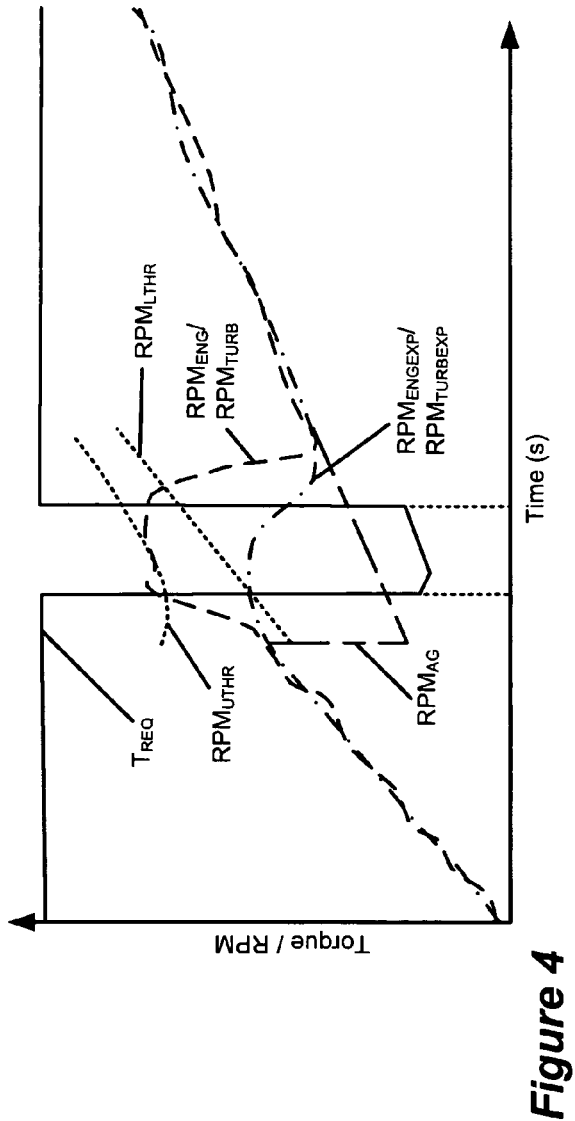
FIG. 4 is a graph illustrating exemplary operating parameters for a first upshift condition in accordance with the overspeed protection control of the present invention.
Figure 5:
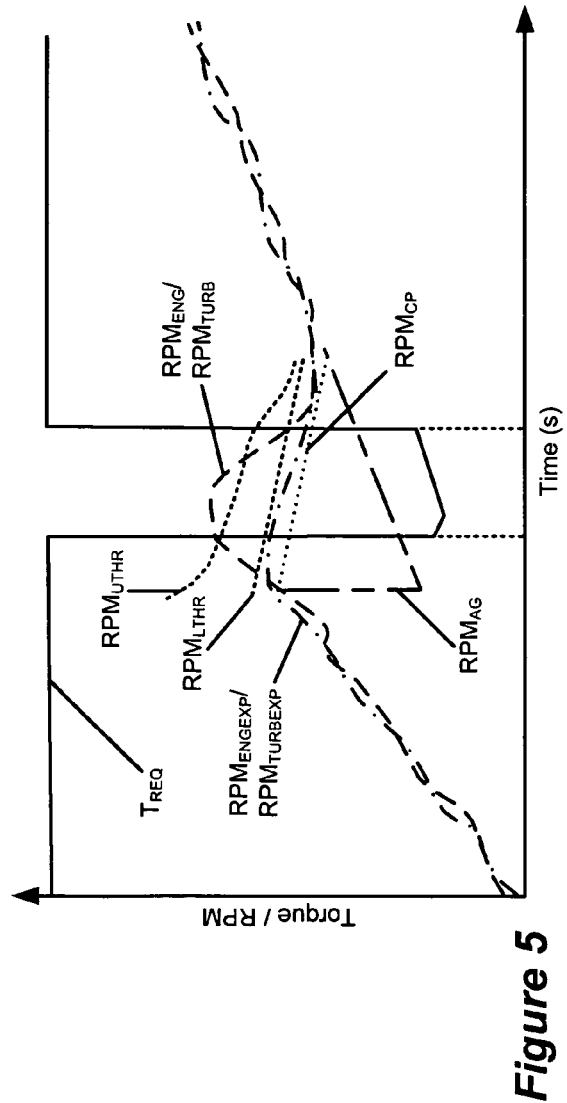
FIG. 5 is a graph illustrating exemplary operating parameters for a second upshift condition in accordance with the overspeed protection control of the present invention.

Referring now to FIGS. 4 and 5, the overspeed protection control implements one of a first strategy (see FIG. 4) and a second strategy (see FIG. 5) during the upshift condition. With particular reference to FIG. 4, the overspeed protection control determines $RPM_{UTHR}$ and $RPM_{LTHR}$ based on the engine and/or turbine RPM associated with the attained gear ratio ($RPM_{AG}$). For example, in the case of an automatic transmission, if a shift from $2^{nd}$ to $3^{rd}$ gear is being performed, the overspeed protection control determines $RPM_{UTHR}$, such that $RPM_{ENG}$ and/or $RPM_{TURB}$ does not exceed a corresponding $2^{nd}$ gear RPM. $RPM_{AG}$ is the desired RPM profile corresponding to the gear that the transmission shifts to as a result of the upshift (e.g., $3^{rd}$ gear for the above example). With particular reference to FIG. 5, the overspeed protection control determines $RPM_{UTHR}$ and $RPM_{LTHR}$ based on a commanded RPM profile ($RPM_{COM}$).

Figure 6:
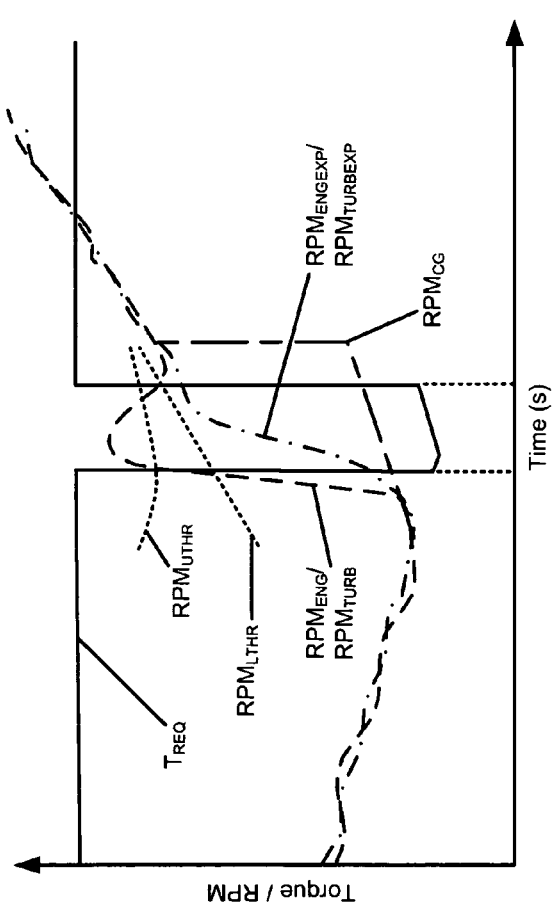
FIG. 6 is a graph illustrating exemplary operating parameters for a first downshift condition in accordance with the overspeed protection control of the present invention.
Figure 7:
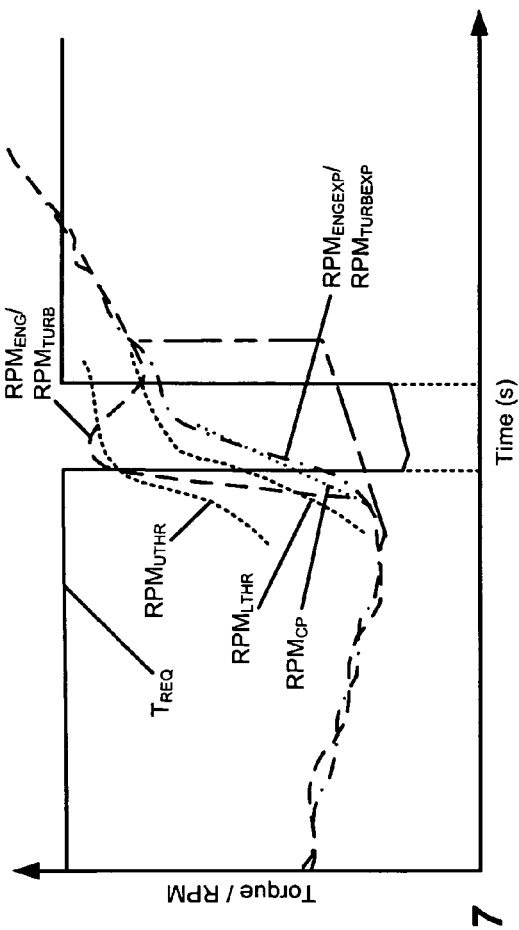
FIG. 7 is a graph illustrating exemplary operating parameters for a second downshift condition in accordance with the overspeed protection control of the present invention.

Referring now to FIGS. 6 and 7, the overspeed protection control can implement one of a first strategy (see FIG. 6) and a second strategy (see FIG. 7) during the downshift condition. With particular reference to FIG. 6, the overspeed protection control determines $RPM_{UTHR}$ and $RPM_{LTHR}$ based on the engine and/or turbine RPM associated with the commanded gear ratio ($RPM_{CG}$). For example, in the case of an automatic transmission, if a shift from $3^{rd}$ to $2^{nd}$ gear is being performed, the overspeed protection control determines $RPM_{UTHR}$, such that $RPM_{ENG}$ and/or $RPM_{TURB}$ does not exceed a corresponding $2^{nd}$ gear RPM. With particular reference to FIG. 7, the overspeed protection control determines $RPM_{UTHR}$ and $RPM_{LTHR}$ based on a $RPM_{COM}$ for the downshift.

Figure 8:
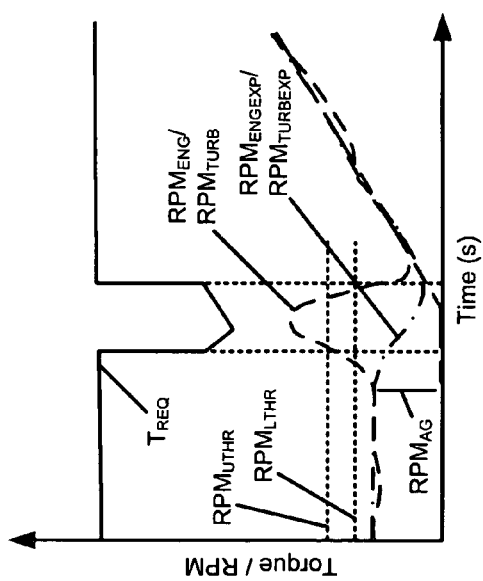
FIG. 8 is a graph illustrating exemplary operating parameters for a garage shift condition in accordance with the overspeed protection control of the present invention.
Figure 9:
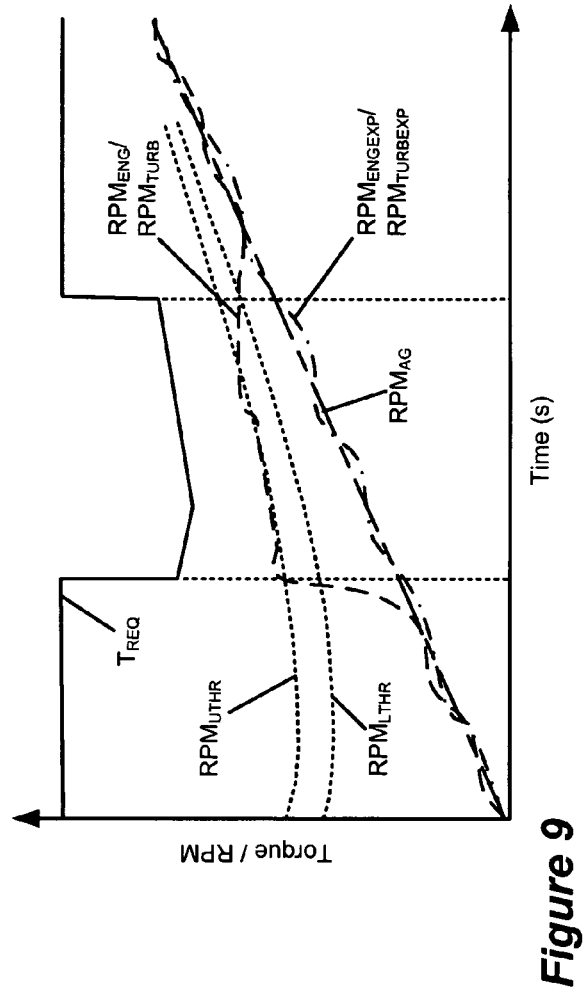
FIG. 9 is a graph illustrating exemplary operating parameters for a steady gear condition in accordance with the overspeed protection control of the present invention.

Referring now to FIG. 8, the overspeed protection control determines $RPM_{UTHR}$ and $RPM_{LTHR}$ based on a maximum engine speed limit ($RPM_{ENGMAX}$) because there is no profile to follow during the garage shift/neutral idle operation. Referring now to FIG. 9, the overspeed protection control determines $RPM_{UTHR}$ and $RPM_{LTHR}$ based on a turbine speed profile for the actual gear ($RPM_{GEAR}$). During a steady gear condition, the actual $RPM_{ENG}$ and/or $RPM_{TURB}$ should not vary from respective theoretical $RPM_{ENG}$ and $RPM_{TURB}$ values.

Figure 10:
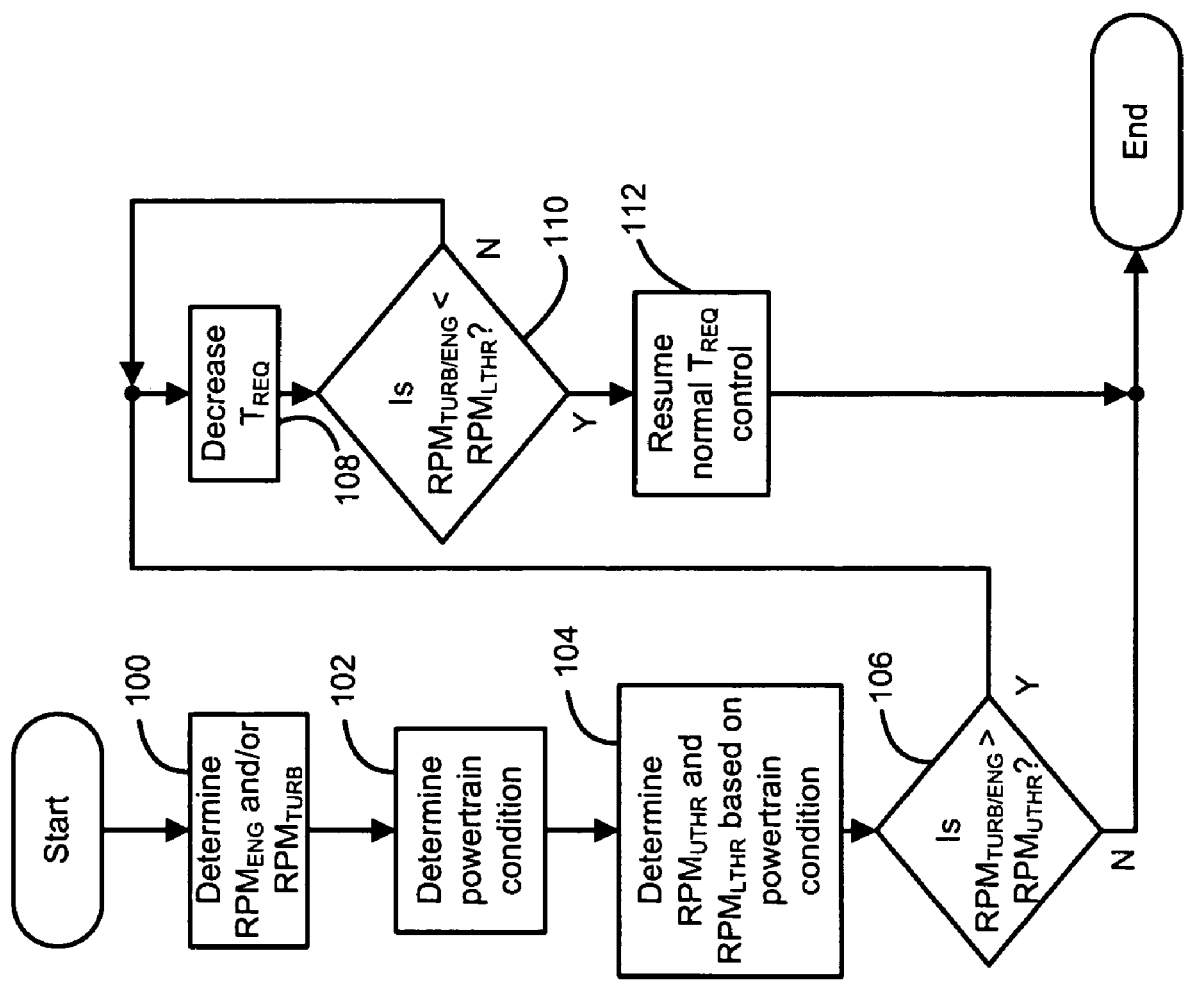
FIG. 10 is a flowchart illustrating exemplary steps executed by the overspeed protection control of the present invention.

Referring now to FIG. 10, exemplary steps that are executed by the overspeed protection control of the present invention will be described in detail. In step 100, control determines $RPM_{ENG}$ and/or $RPM_{TURB}$. In step 102, control determines the powertrain condition. Control determines $RPM_{UTHR}$ and $RPM_{LTHR}$ based on the powertrain condition in step 104.

In step 106, control determines whether at least one of $RPM_{ENG}$ and $RPM_{TURB}$ is greater than $RPM_{UTHR}$. If $RPM_{ENG}$ and/or $RPM_{TURB}$ is not greater then $RPM_{UTHR}$, control ends. If $RPM_{ENG}$ and/or $RPM_{TURB}$ is greater than $RPM_{UTHR}$, control decreases $T_{REQ}$ in step 108. As discussed above, $T_{REQ}$ can be reduced by a fixed amount or by an amount that is determined based on the difference between $RPM_{ENG}$ or $RPM_{TURB}$ and $RPM_{UTHR}$. In step 110, control determines whether $RPM_{ENG}$ and/or $RPM_{TURB}$ is less than $RPM_{LTHR}$. If $RPM_{ENG}$ and/or $RPM_{TURB}$ is not less then $RPM_{LTHR}$, control loops back to step 108. If $RPM_{ENG}$ or $RPM_{TURB}$ is less than $RPM_{LTHR}$, control resumes normal $T_{REQ}$ control in step 112 and control ends.

Figure 11:
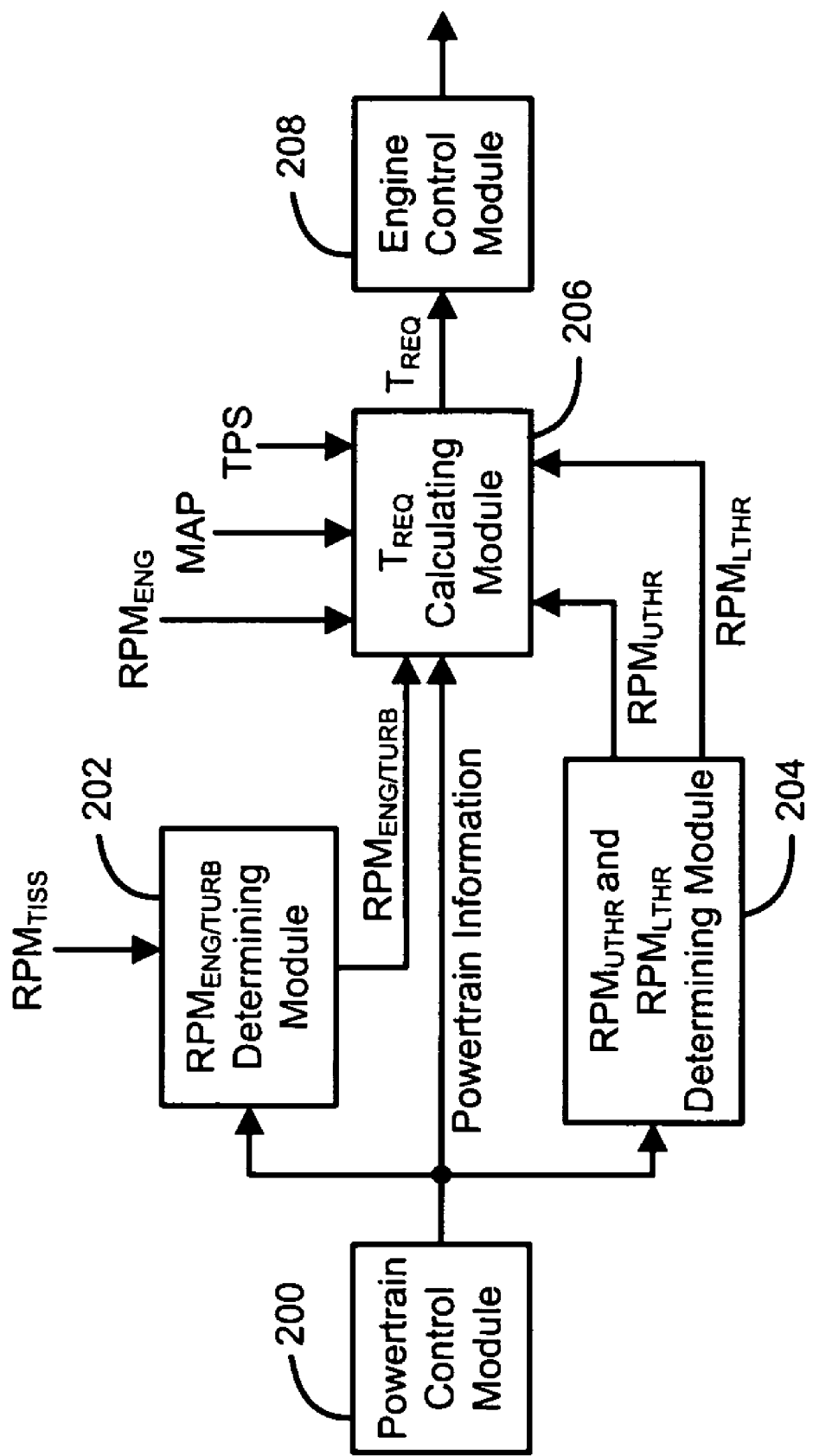
FIG. 11 is a functional block diagram of exemplary modules that execute the overspeed protection control of the present invention.

Referring now to FIG. 11, exemplary modules that execute the overspeed protection control will be described in detail. The exemplary modules include, but are not limited to, a powertrain control module 200, an $RPM_{ENG}$ and/or $RPM_{TURB}$ determining module 202, an $RPM_{UTHR}$ and $RPM_{LTHR}$ determining module 204, a $T_{REQ}$ calculating module 206 and an engine control module 208. The powertrain control module 200 regulates general operation of the powertrain components and outputs powertrain information to the $RPM_{TURB}$ determining module 202 and the $T_{REQ}$ calculating module. More specifically, the $RPM_{ENG}$ and/or $RPM_{TURB}$ determining module receives the TISS signal as an input, and both the $RPM_{UTHR}$ and $RPM_{LTHR}$ determining module and the $T_{REQ}$ calculating module 206 receive the powertrain operating condition.

The $RPM_{ENG}$ and/or $RPM_{TURB}$ determining module 202 determines $RPM_{ENG}$ and/or $RPM_{TURB}$. The $RPM_{UTHR}$ and $RPM_{LTHR}$ determining module 204 determines $RPM_{UTHR}$ and $RPM_{LTHR}$ based on the powertrain operating condition. The $T_{REQ}$ calculating module 206 calculates $T_{REQ}$ based on either the overspeed protection control of the present invention, or the normal $T_{REQ}$ control. Under the overspeed protection control, the $T_{REQ}$ calculating module 206 determines $T_{REQ}$ based on $RPM_{ENG}$ and/or $RPM_{TURB}$, the powertrain operating condition, $RPM_{UTHR}$ and $RPM_{LTHR}$. Under the normal $T_{REQ}$ control, the $T_{REQ}$ calculating module 206 determines $T_{REQ}$ based on operating parameters including, but not limited to $RPM_{ENG}$, MAP and TPS. The engine control module 208 regulates operation of the engine 12 to achieve $T_{REQ}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An overspeed protection control system that inhibits an overspeed condition in a vehicle powertrain, comprising:
    a first module that monitors at least one of an engine speed and a transmission input shaft speed;
    a second module that determines a transmission operating condition of said vehicle powertrain;
    a third module that determines a first threshold speed based on said transmission operating condition; and
    a fourth module that reduces an engine torque request when said at least one of said engine speed and said transmission input shaft speed exceeds said first threshold speed.

2. The overspeed protection control system of claim 1 wherein said fourth module provides a fixed torque reduction amount, and reduces said engine torque request by said fixed torque reduction amount.

3. An overspeed protection control system that inhibits an overspeed condition in a vehicle powertrain, comprising:
    a first module that monitors at least one of an engine speed and a transmission input shaft speed;
    a second module that determines an operating condition of said vehicle powertrain;
    a third module that determines a first threshold speed based on said operating condition; and
    a fourth module that reduces an engine torque request when said at least one of said engine speed and said transmission input shaft speed exceeds said first threshold speed,
    wherein said fourth module determines a torque reduction amount based on a difference between said at least one of said engine speed and said transmission input shaft speed and said first threshold speed, and reduces said engine torque request by said torque reduction amount.

4. The overspeed protection control system of claim 1 wherein said third module determines a second threshold speed based on said transmission operating condition and determines said engine torque request without a reduction when said at least one of said engine speed and said transmission input shaft speed is less than said second threshold speed.

5. The overspeed protection control system of claim 1 wherein said third module determines said first threshold speed based on one of an attained gear speed, a commanded gear speed and a commanded speed profile.

6. An overspeed protection control system that inhibits an overspeed condition in a vehicle powertrain, comprising:
a first module that monitors at least one of an engine speed and a transmission input shaft speed;
a second module that determines an operating condition of said vehicle powertrain:
a third module that determines a first threshold speed based on said operating condition; and
a fourth module that reduces an engine torque request when said at least one of said engine speed and said transmission input shaft speed exceeds said first threshold speed,
wherein said third module determines said first threshold speed based on one of an attained gear speed, a commanded gear speed and a commanded speed profile and
wherein said operating condition is one of an upshift and a downshift of a gear ratio of said transmission.

7. An overspeed protection control system that inhibits an overspeed condition in a vehicle powertrain, comprising:
a first module that monitors at least one of an engine speed and a transmission input shaft speed;
a second module that determines an operating condition of said vehicle powertrain;
a third module that determines a first threshold speed based on said operating condition; and
a fourth module that reduces an engine torque request when said at least one of said engine speed and said transmission input shaft speed exceeds said first threshold speed,
wherein said operating condition is one of a garage shift condition and a neutral idle condition and said first threshold speed corresponds to a maximum engine speed limit.

8. The overspeed protection control system of claim 1 wherein said transmission is one of an automatic transmission and a continuously variable transmission.

9. A method of inhibiting an overspeed condition in a vehicle powertrain, comprising:
monitoring at least one of an engine speed and a transmission input shaft speed;
determining a transmission operating condition of said vehicle powertrain;
determining a first threshold speed based on said transmission operating condition; and
reducing an engine torque request when said at least one of said engine speed and said transmission input shaft speed exceeds said first threshold speed.

10. The method of claim 9 further comprising providing a fixed torque reduction amount, wherein said engine torque request is reduced by said fixed torque reduction amount.

11. A method of inhibiting an overspeed condition in a vehicle powertrain, comprising:
monitoring at least one of an engine speed and a transmission input shaft speed;
determining an operating condition of said vehicle powertrain;
determining a first threshold speed based on said transmission operating condition;
reducing an engine torque request when said at least one of said engine speed and said transmission input shaft speed exceeds said first threshold speed; and
determining a torque reduction amount based on a difference between said at least one of said engine speed and said transmission input shaft speed and said first threshold speed, wherein said engine torque request is reduced by said torque reduction amount.

12. The method of claim 9 further comprising:
determining a second threshold speed based on said transmission operating condition; and
determining said engine torque request without a reduction when said at least one of said engine speed and said transmission input shaft speed is less than said second threshold speed.

13. The method of claim 9 wherein said first threshold speed is determined based on one of an attained gear speed, a commanded gear speed and a commanded speed profile.

14. A method of inhibiting an overspeed condition in a vehicle powertrain, comprising:
monitoring at least one of an engine speed and a transmission input shaft speed;
determining an transmission operating condition of said vehicle powertrain;
determining a first threshold speed based on said transmission operating condition; and
reducing an engine torque request when said at least one of said engine speed and said transmission input shaft speed exceeds said first threshold speed,
wherein said first threshold speed is determined based on one of an attained gear speed, a commanded gear speed and a commanded speed profile, and
wherein said operating condition is one of an upshift and a downshift of a gear ratio of said transmission.

15. A method of inhibiting an overspeed condition in a vehicle powertrain, comprising:
monitoring at least one of an engine speed and a transmission input shaft speed;
determining an transmission operating condition of said vehicle powertrain;
determining a first threshold speed based on said transmission operating condition; and
reducing an engine torque request when said at least one of said engine speed and said transmission input shaft speed exceeds said first threshold speed,
wherein said operating condition is one of a garage shift condition and a neutral idle condition and said first threshold speed corresponds to a maximum engine speed limit.

16. The method of claim 9 wherein said transmission is one of an automatic transmission and a continuously variable transmission.

17. A method of inhibiting an overspeed condition in a vehicle powertrain, comprising:
monitoring at least one of an engine speed and a transmission input shaft speed;
determining a transmission operating condition of said vehicle powertrain;
determining a first and second threshold speeds based on said transmission operating condition;
reducing an engine torque request when said at least one of said engine speed and said transmission input shaft speed exceeds said first threshold speed; and
determining said engine torque request without a reduction when said at least one of said engine speed and said transmission input shaft speed is less than said second threshold speed.

18. The method of claim 17 further comprising providing a fixed torque reduction amount, wherein said engine torque request is reduced by said fixed torque reduction amount.

19. A method of inhibiting an overspeed condition in a vehicle powertrain, comprising:

monitoring at least one of an engine speed and a transmission input shaft speed;

determining an operating condition of said vehicle powertrain;

determining a first and second threshold speeds based on said operating condition;

reducing an engine torque request when said at least one of said engine speed and said transmission input shaft speed exceeds said first threshold speed;

determining said engine torque request without a reduction when said at least one of said engine speed and said transmission input shaft speed is less than said second threshold speed; and determining a torque reduction amount based on a difference between said at least one of said engine speed and said transmission input shaft speed and said first threshold speed, wherein said engine torque request is reduced by said torque reduction amount.

20. The method of claim 17 wherein said first threshold speed is determined based on one of an attained gear speed, a commanded gear speed and a commanded speed profile.

21. A method of inhibiting an overspeed condition in a vehicle powertrain, comprising:

monitoring at least one of an engine speed and a transmission input shaft speed;

determining an operating condition of said vehicle powertrain;

determining a first and second threshold speeds based on said operating condition;

reducing an engine torque request when said at least one of said engine speed and said transmission input shaft speed exceeds said first threshold speed; and determining said engine torque request without a reduction when said at least one of said engine speed and said transmission input shaft speed is less than said second threshold speed, wherein said first threshold speed is determined based on one of an attained gear speed, a commanded gear speed and a commanded speed profile, and wherein said operating condition is one of an upshift and a downshift of a gear ratio of said transmission.

22. A method of inhibiting an overspeed condition in a vehicle powertrain, comprising:

monitoring at least one of an engine speed and a transmission input shaft speed;

determining an operating condition of said vehicle powertrain;

determining a first and second threshold speeds based on said operating condition;

reducing an engine torque request when said at least one of said engine speed and said transmission input shaft speed exceeds said first threshold speed; and determining said engine torque request without a reduction when said at least one of said engine speed and said transmission input shaft speed is less than said second threshold speed, wherein said operating condition is one of a garage shift condition and a neutral idle condition and said first threshold speed corresponds to a maximum engine speed limit.

23. The method of claim 17 wherein said transmission is one of an automatic transmission and a continuously variable transmission.

* * * * *